(12) United States Patent
Wang et al.

(10) Patent No.: US 12,321,180 B2
(45) Date of Patent: Jun. 3, 2025

(54) MOTION STATE CONTROL METHOD AND APPARATUS, DEVICE, AND READABLE STORAGE MEDIUM

(71) Applicant: Tencent Technology (Shenzhen) Company Limited, Shenzhen (CN)

(72) Inventors: Shuai Wang, Shenzhen (CN); Jingfan Zhang, Shenzhen (CN); Jie Lai, Shenzhen (CN); Dongsheng Zhang, Shenzhen (CN); Ke Chen, Shenzhen (CN); Yu Zheng, Shenzhen (CN); Zhengyou Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 156 days.

(21) Appl. No.: 17/966,027

(22) Filed: Oct. 14, 2022

(65) Prior Publication Data
US 2023/0168693 A1   Jun. 1, 2023

Related U.S. Application Data

(63) Continuation of application No. PCT/CN2022/071024, filed on Jan. 10, 2022.

(30) Foreign Application Priority Data

Jan. 14, 2021  (CN) .......................... 202110049662.8

(51) Int. Cl.
*G05D 1/00*     (2024.01)
*B25J 5/00*     (2006.01)
(Continued)

(52) U.S. Cl.
CPC ............ *G05D 1/0891* (2013.01); *B25J 5/007* (2013.01); *B25J 9/1633* (2013.01); *B25J 9/1653* (2013.01); *B25J 13/085* (2013.01); *B25J 19/0008* (2013.01)

(58) Field of Classification Search
CPC .. G05D 1/0891; G05D 1/0221; G05D 1/0223; G05D 1/0251; G05D 1/0255;
(Continued)

(56) References Cited

U.S. PATENT DOCUMENTS 8,041,456 B1    10/2011  Blackwell et al.
2004/0193293 A1  9/2004  Watanabe et al.
(Continued)

FOREIGN PATENT DOCUMENTS

CN   104155976 A   11/2014
CN   104316055 A    1/2015
(Continued)

OTHER PUBLICATIONS

"NXTway-GS (Self-Balancing Two-Wheeled Robot) Controller Design—File Exchange—MATLAB Central", May 1, 2009 (May 1, 2009), XP093126465, Retrieved from the Internet <URL:https://de.mathworks.com/matlabcentral/fileexchange/19147-nxtway-gs-self-balancing-two-wheeled-robot-controller-design> (Year: 2009).*
(Continued)

*Primary Examiner* — Yonel Beaulieu
*Assistant Examiner* — Aarron E Santos
(74) *Attorney, Agent, or Firm* — Crowell & Moring LLP (57) ABSTRACT

This application relates to the field of robot control, and provides a motion state control method and apparatus, a device, and a readable storage medium. The method includes the following steps: Step 301: Acquire basic data and motion state data, the basic data being used for representing a structural feature of a wheeled robot, and the motion state data being used for representing a motion feature of the wheeled robot. Step 302: Determine a state matrix of the wheeled robot based on the basic data and the motion state data, the state matrix being related to an interference parameter of the wheeled robot, the interference
(Continued)

parameter corresponding to a balance error of the wheeled robot. Step 303: Determine, based on the state matrix, a torque for controlling the wheeled robot. Step 304: Control, by using the torque, the wheeled robot to be in a standstill state.

15 Claims, 5 Drawing Sheets

(51) Int. Cl.
*B25J 9/16* (2006.01)
*B25J 13/08* (2006.01)
*B25J 19/00* (2006.01)

(58) Field of Classification Search
CPC .... G05D 1/0259; G05D 1/0278; G05D 1/028; G05D 1/0285; G06F 3/0481; B25J 13/085; B25J 19/0008; B25J 5/007; B25J 9/1633; B25J 9/1653
See application file for complete search history.

(56) References Cited

U.S. PATENT DOCUMENTS

| | | | |
|---|---|---|---|
| 2008/0230285 A1 | 9/2008 | Bewley et al. | |
| 2017/0144299 A1* | 5/2017 | Lafaye | B25J 9/162 |
| 2019/0258275 A1* | 8/2019 | Saunders | B25J 15/00 |
| 2020/0206905 A1 | 7/2020 | Han | |

FOREIGN PATENT DOCUMENTS

| | | | |
|---|---|---|---|
| CN | 107024938 A | | 8/2017 |
| CN | 108121334 A | * | 6/2018 |
| CN | 108327812 A | | 7/2018 |
| CN | 110525535 A | | 12/2019 |
| CN | 110764413 A | | 2/2020 |
| CN | 111216826 A | | 6/2020 |
| CN | 113485398 A | | 10/2021 |
| CN | 113753146 A | | 12/2021 |
| CN | 113753150 A | | 12/2021 |
| EP | 3 696 060 A1 | | 8/2020 |
| JP | 2004-299010 A | | 10/2004 |
| JP | 2007290054 A | | 11/2007 |
| JP | 2009-512563 A | | 3/2009 |
| JP | 2011-195079 A | | 10/2011 |
| JP | 2012-250569 A | | 12/2012 |
| JP | 2014-80107 A | | 5/2014 |
| JP | 2016-057917 A | | 4/2016 |
| WO | WO 2013/084354 A1 | | 6/2013 |
| WO | WO 2014/141356 A1 | | 9/2014 |

OTHER PUBLICATIONS

Office Action issued on European application 227389640, dated Mar. 15, 2024, 12 pages.
Yorihisa Yamamoto "NXTway-GS (Self-Balancing Two-Wheeled Robot) Controller Design", Mathworks File Exchange, May 1, 2009 http://www.mathworks.com/matlabcentral/fileexchange/19147-nxtway-gs-self-balancing-two-wheeled-robot-controller-design.
International Search Report and Written Opinion for PCT/CN2022/071024 mailed Mar. 22, 2022 including translation of Search Report and Written Opinion (17 pages).
Office Action issued on Chinese Patent Application No. 202110049662. 8, dated Aug. 28, 2024, w/English translation, 41 pages.
Lia Jiachen, "Research on motion control of wheel-legged bionic robot" Harbin Institute of Technology, Feb. 2020, w/English translation, 261 pages.
Xuechao Liu, "Design of Self-Balancing Two Wheeled Vehicle and research on its variable structure control", Master's Degree Thesis, Xidian University, Jan. 2009, w/English translation, 216 pages.
Ding et al., "Design and analysis of a novel metamorphic wheel-legged rover mechanism" Journal of Central South University (Science and Technology), vol. 40, Sep. 10, 2009, w/English translation of Abstract only, 11 pages.

* cited by examiner

Standstill state

MOTION STATE CONTROL METHOD AND APPARATUS, DEVICE, AND READABLE STORAGE MEDIUM

RELATED APPLICATION

This application is a continuation of International Application No. PCT/CN2022/071024, filed Jan. 10, 2022, which claims priority to Chinese Patent Application No. 202110049662.8, entitled "MOTION STATE CONTROL METHOD AND APPARATUS, DEVICE, AND READABLE STORAGE MEDIUM", and filed on Jan. 14, 2021. The contents of International Application No. PCT/CN2022/071024 and Chinese Patent Application No. 202110049662.8 are incorporated herein by reference in their entirety.

FIELD OF THE TECHNOLOGY

Embodiments of this application relate to the field of robot control, and in particular, to a motion state control method and apparatus, a device, and a readable storage medium.

BACKGROUND OF THE DISCLOSURE

A wheeled robot is a robot structure that controls motion of a robot body through a wheel structure. Since a contact point between the wheeled robot and the ground includes only a contact point between a wheel and the ground, a problem regarding balance control occurs in a case that the wheel structure is not stably arranged. In the related art, a conventional linear model is usually used for control.

However, the related art does not take into account a physical difference between an actual wheeled robot and a desired model. Due to a mounting error or a difference between the similar models, an actual balance point may be different from a balance point in the desired model, resulting in an error in a wheel rotation torque required for balance control. Therefore, the above manner cannot realize stable balance control of the wheeled robot and has poor stability.

SUMMARY

Embodiments of this application provide a motion state control method and apparatus, a device, and a readable storage medium, which can improve the stability and the accuracy of controlling a wheeled robot. The technical solutions are as follows:

An aspect provides a motion state control method applicable to a wheeled robot. The method includes:
controlling the wheeled robot to be in an initial motion state, the initial motion state being a motion state of the wheeled robot in a first time period; and
controlling the wheeled robot to switch from the initial motion state to a standstill state, the wheeled robot being in the standstill state through continuous adjustment according to a balance error in a second time period.

Another aspect provides a control apparatus for controlling a motion state of a wheeled robot. The apparatus includes:
a control module, configured to control the wheeled robot to be in an initial motion state, the initial motion state being a motion state of the wheeled robot in a first time period,
the control module being further configured to control the wheeled robot to switch from the initial motion state to a standstill state, the wheeled robot being in the standstill state through continuous adjustment according to a balance error in a second time period.

Another aspect provides a wheeled robot. The wheeled robot includes a processor and a memory storing at least one program, the at least one program being loaded and executed by the processor to implement the motion state control method according to any one of the above embodiments of this application.

According to another aspect, a computer-readable storage medium is provided, storing at least one instruction, at least one segment of program, a code set, or an instruction set, the at least one instruction, the at least one segment of program, the code set or the instruction set being loaded and executed by a processor to implement the motion state control method according to any one of the foregoing embodiments of this application.

According to another aspect, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the motion state control method described in any one of the foregoing embodiments.

The technical solutions provided in the embodiments of this application include at least the following beneficial effects:

Before the torque for controlling the wheeled robot is determined, the state matrix that embodies the balance error of the robot is first determined, so as to determine, based on the state matrix, the torque for controlling the wheeled robot, and the wheel of the wheeled robot is controlled by using the torque, so as to control the wheeled robot to be in the standstill state, thereby improving the accuracy of controlling the wheeled robot having the balance error.

DESCRIPTION OF EMBODIMENTS

First, terms involved in the embodiments of this application are introduced as follows:

Wheeled robot: which is a robot structure that controls motion of a robot body through a wheel structure. Since a contact point between the wheeled robot and the ground includes only a contact point between a wheel and the ground, a problem regarding balance control occurs in a case that the wheel structure is not stably arranged. In some embodiments, the wheeled robot further includes a wheel-legged robot or a robot including a fixed wheel. The wheel-legged robot is a robot structure in which the wheel is fixed to a wheel leg and the wheel leg is foldable to adjust a height of the wheeled robot. The robot including a fixed wheel is a robot structure in which the wheel is fixed to a specified position of a robot body and a height of the robot is unadjustable. In this embodiment, the wheel-legged robot is used as an example for description.

Observer: The observer is a mathematical tool that can modify, according to an error between an estimated iteration value and an actual iteration value through iterative updating, a target mathematical relationship estimated by the observer, so as to finally obtain a relatively accurate target mathematical relationship. In the field of dynamics, the observer may iteratively update, by observing a physical quantity, a dynamic relationship estimated by the observer, so as to finally determine a relatively accurate dynamic relationship.

In the embodiments of this application, the wheeled robot is implemented as a wheeled biped robot, for example. That is to say, the wheeled biped robot includes two wheels configured to move. The two wheels are respectively connected to a leg structure, and are connected to a robot body by the leg structure, so that the two wheels drive the robot body to complete motion control. However, it is to be understood that the wheeled robot in this application is not limited to the above structure. Any wheeled robot is to be understood as any robot that includes a wheeled structure.

Figure 1:
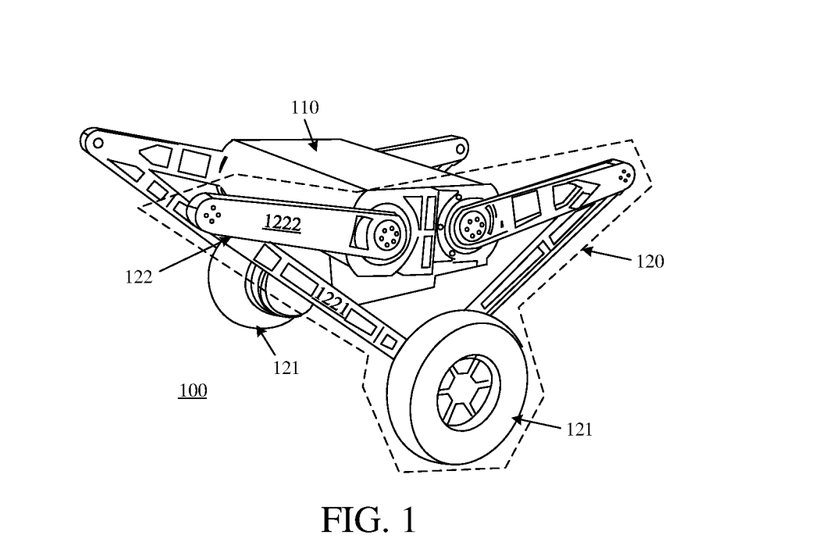
FIG. 1 is a schematic structural diagram of a wheeled robot according to an exemplary embodiment of this application.

Exemplarily, FIG. 1 is a schematic structural diagram of a wheeled robot according to an exemplary embodiment of this application. As shown in FIG. 1, a wheeled robot 100 includes a body portion 110 and a wheel leg portion 120.

The body portion 110 is connected to the wheel leg portion 120. The wheel leg portion 120 includes two wheels 121 and leg structures 122, and the leg structures 122 are configured to connect the wheels 121 to the body portion 110. As shown in FIG. 1, the wheeled robot 100 includes a total of four leg structures 122, and two of the four leg structures 122 are respectively connected to one of the wheels 121. Exemplarily, a leg structure A, a leg structure B, a leg structure C, and a leg structure D are arranged. The leg structure A and the leg structure B are connected to a first one of the wheels, and the leg structure C and the leg structure D are connected to a second one of the wheels. A structure of two parallel leg planes of the wheeled robot is formed by the leg structure A, the leg structure B and the first wheel and by the leg structure C, the leg structure D, and the second wheel. The legs connected in parallel has five rotating joints each having two translational degrees of freedom in transverse and vertical directions. Compared with a series structure, the parallel structure has a compact structure, a high rigidity, and a strong bearing capacity. Therefore, the robot can jump higher and overcome obstacles nimbly.

Optionally, each of the leg structures 122 includes a calf segment 1221 and a thigh segment 1222. The calf segment 1221 and the thigh segment 1222 are connected by a rotating joint, and the calf segment 1221 and the wheel 121 are also connected by a rotating joint.

Four motors respectively corresponding to the four leg structures 122 are arranged in the body portion 110. Each leg structure 122 corresponds to a motor. The four motors are configured to control bending and unbending of the leg structure 122. In some embodiments, a segment of the leg structure 122 connected to the body portion 110 is connected by the rotating joint. Exemplarily, as shown in FIG. 1, when the motor drives the rotating joint to rotate clockwise, the leg structure 122 is controlled to gradually bend. When the motor drives the rotating joint to rotate counterclockwise, the leg structure 122 is controlled to gradually unbend (The two leg structures 122 are driven by the rotating joints in the same way or different ways). That is to say, relationships between clockwise and counterclockwise rotation modes and bending and unbending control modes are the same or different.

Figure 2:
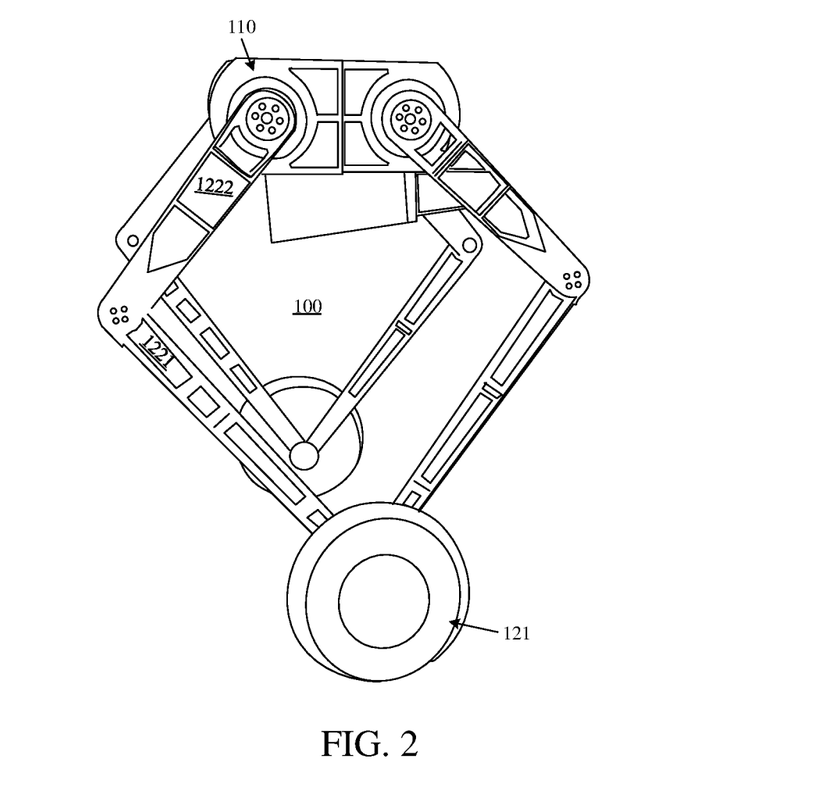
FIG. 2 is a schematic diagram showing a wheeled robot at a different height according to an exemplary embodiment of this application.

The bending and unbending of the leg structure 122 (that is, a relative positional relationship between the calf segment 1221 and the thigh segment 1222) is used for controlling a height of the wheeled robot 100. That is to say, the height of the wheeled robot 100 decreases when the leg structure 122 tends to bend, and the height of the wheeled robot 100 increases when the leg structure 122 tends to unbend. The leg structure 122 shown in FIG. 1 is bent to a relatively large extent. In this case, the wheeled robot 100 is relatively low. Exemplarily, referring to FIG. 2, a bending degree of the leg structure 122 is less than that of the leg structure 122 in FIG. 1. At the bending degree, the wheeled robot 100 is relatively high. At the different heights in FIG. 1 and FIG. 2, balancing performance of the wheeled robot also varies, and therefore balance control torques at the two heights are different.

The wheel 121 is a driver, that is, the wheel 121 can realize active rotation after being driven by the motor, so as to realize motion state control of the wheeled robot 100. For example, the wheel controls the wheeled robot to move forward, control the wheeled robot to retreat, control the wheeled robot to turn, or control the wheeled robot to stand still.

Based on the structure including the body portion 110 and the wheel leg portion 120 in the wheeled robot 100, the wheeled robot 100 may be approximated as a cart-inverted pendulum structure. The height of the wheeled robot 100 corresponds to a pendulum length of the inverted pendulum structure.

The body portion 110 and the wheel 121 account for a majority of the wheeled robot 100 in weight. A weight factor of the body portion 110 mainly includes four motors for driving the leg structure 122, a microcomputer, a circuit board, a motor, a battery, and the like.

A dynamic model of the wheeled robot 100 may be expressed by the following equation I:

$$(M+m)\ddot{x}+ml\cos(\theta)\ddot{\theta}-ml\sin(\theta)\dot{\theta}^2=u$$

$$ml\cos\ddot{x}+ml^2\ddot{\theta}-mgl\sin(\theta)=0. \quad \text{Equation I:}$$

m represents a mass of a cart body of the wheeled robot, that is, a mass of the body portion, M presents a mass of the wheel of the wheeled robot, l is a current height of the wheeled robot, that is, a height of the wheeled robot in a current leg structure, X represents a rotation distance of the wheel, $\dot{x}$ represents a rotational linear velocity of the wheel, $\ddot{x}$ represents a rotational linear acceleration, $\theta$ represents a tilt angle of the wheeled robot, $\dot{\theta}$ represents a tilt rate of the wheeled robot, and $\ddot{\theta}$ represents a tilt acceleration of the wheeled robot. In this embodiment, the tilt angle $\theta$ is the pitch angle of the wheeled robot, for example. u is thrust applied to the wheeled robot, and a correspondence exists between u and a torque applied to the wheel.

Since only one contact point exists between the ground and the wheeled structure (that is, the contact point between the wheel and the ground), the wheeled robot has a problem regarding balance control when the plurality of wheeled structures are not stably arranged. Since a mass distribution of the robot changes, a balance point is usually away from a position predicted by an approximation model. Therefore, it is difficult to provide an accurate reference position for balance control. In this case, an output of the system may be regulated through output regulation to a desired state with unknown interference. In an embodiment of this application, an output regulation controller that can improve the balance control effect for the wheeled robot is provided.

In this embodiment of this application, the wheeled robot is first controlled to be in an initial motion state, the initial motion state is a motion state of the wheeled robot in a first time period, so as to control the wheeled robot to switch from the initial motion state to a standstill state. The wheeled robot being in the standstill state through continuous adjustment according to a balance error in a second time period.

In some embodiments, the initial motion state includes at least one of the following states: leaning still on the ground, constant speed movement, accelerated movement, or jumping. The first time period precedes the second time period in timing.

In some embodiments, the wheeled robot is controlled, according to a received control instruction to switch to the standstill state at a start moment of the second time period. Alternatively, in some embodiments, the wheeled robot is controlled according to path planning data to switch to the standstill state at the start moment of the second time period. This is not limited in this embodiment.

Figure 3:
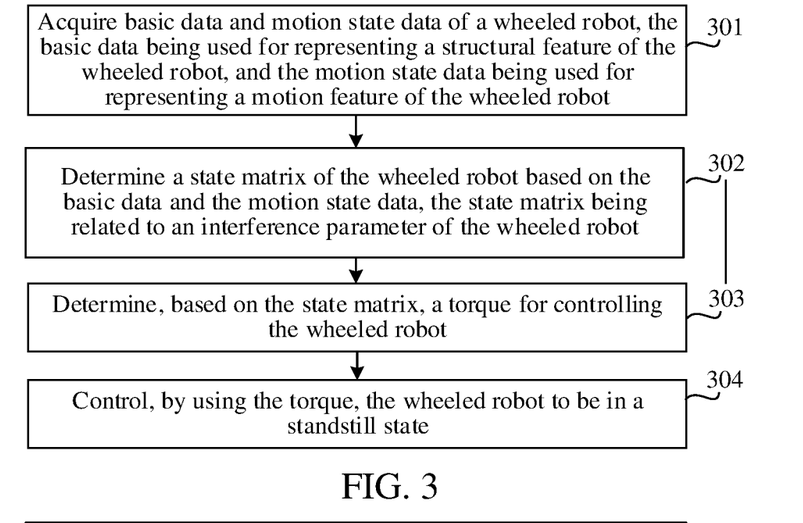
FIG. 3 is a flowchart of a motion state control method according to an exemplary embodiment of this application.

The control of the wheeled robot to switch from the initial motion state to the standstill state is performed according to basic data and motion state data of the wheeled robot'. FIG. 3 is a flowchart of a motion state control method according to an exemplary embodiment of this application. The method may be implemented in the microprocessor of the wheeled robot. As shown in FIG. 3, in the above second time period, the control of the wheeled robot to switch from the initial motion state to the standstill state includes the following steps:

Step 301: Acquire basic data and motion state data of the wheeled robot, the basic data being used for representing a structural feature of the wheeled robot, and the motion state data being used for representing a motion feature of the wheeled robot.

Optionally, the basic data of the wheeled robot and real-time motion state data of the wheeled robot are acquired.

The basic data is used for representing the structural feature of the wheeled robot. The structural feature includes physical values of a plurality of parts of the robot. Taking the wheeled biped robot 100 in FIG. 1 as an example, the structural feature includes a height of a current leg structure, a mass of the body portion, a mass of the wheel, a radius of the wheel, a distance between two wheels, and the like. The structural feature may further include a linkage structure among the parts. For example, in the wheeled biped robot 100 in FIG. 1, the body portion and the leg structure move leftward relative to the wheel through linkage when the wheel is controlled to rotate clockwise so as to control the wheeled robot to move rightward. The linkage structure may also be embodied in the basic data. This application does not limit a specific form or content of the basic data.

In some embodiments, since the basic structure of the wheeled robot is partially fixed, some basic data may be preset. Taking the wheeled biped robot 100 in FIG. 1 as an example, the fixed basic data may include first mass data of the body portion, second mass data of the wheel in the wheel leg portion, and a correspondence between the angle of the leg structure and the height. In some embodiments, a part of the basic data may be obtained by calculation. Taking the wheeled biped robot 100 in FIG. 1 as an example, the height in the basic data may be calculated according to the angle of the leg structure and the correspondence. The angle of the leg structure is an angle between the calf segment and the thigh segment of the leg structure.

The motion state data is used for representing the motion feature of the wheeled robot, and may include tilt angle data of the wheeled robot and rotation data of the wheel, such as the tilt angle, the tilt rate, the rotation distance of the wheel (that is, a movement distance of the wheeled robot), and the rotational linear velocity of the wheel. This application does not limit a specific form or content of the motion state data.

In some embodiments, the motion state data is detected according to the motion state of the wheeled robot. For example, the tilt angle data of the wheeled robot may be collected and acquired by a sensor, and the data related to the wheel may be read by the motor. This application does not limit a specific manner of acquiring the motion state data.

Step 302: Determine a state matrix of the wheeled robot based on the basic data and the motion state data, the state matrix being related to an interference parameter of the wheeled robot.

The state matrix is a representation of a dynamic equation of the wheeled robot, which may be determined by using the basic data and the motion state data. The interference parameter corresponds to the balance error of the wheeled robot. The balance error is an error between an actual center of gravity and a predicted or calibrated center of gravity. In some cases, the wheeled robot has an assembly error, or a mounting pose of an inertial measurement unit (IMU) has an error, or due to other various reasons, the actual center of gravity is inconsistent with the designed or calibrated center of gravity. Therefore, in this embodiment, the state matrix embodying the interference parameter is predicted, which can facilitate more effective balance control of the wheeled robot. It is to be understood by those skilled in the art that, in some embodiments, the state matrix may be represented as a set of simultaneous dynamic equations.

In some embodiments, an actual interference parameter value may be obtained directly based on the basic data and the motion state data, and then the state matrix is determined according to the basic data, the motion state data, and the interference parameter.

In other embodiments, the basic data and the motion state data may be combined to determine the state matrix of the wheeled robot, and the interference parameter is embodied in the state matrix. In some embodiments, the interference parameter is related to the motion state data and the basic data.

Figure 4:
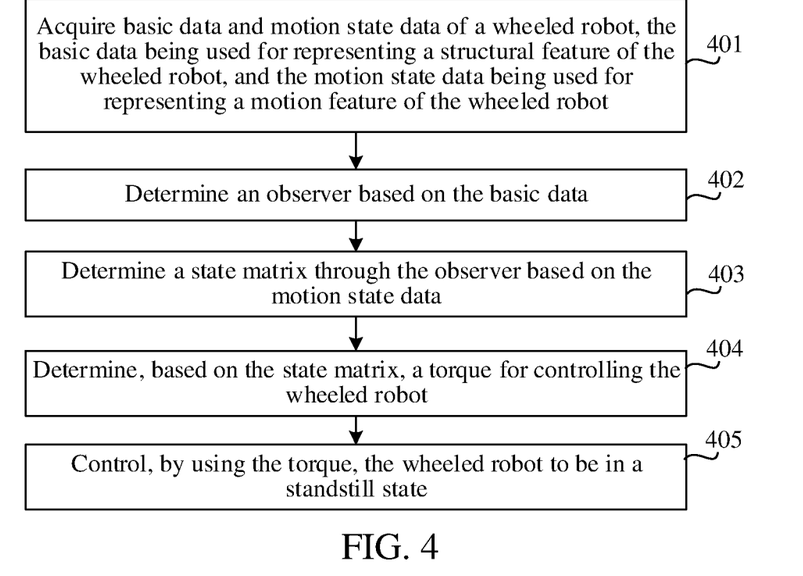
FIG. 4 is a flowchart of a motion state control method according to another exemplary embodiment of this application.

The following discloses an exemplary specific implementation with reference to FIG. 4, but this application does not limit the specific implementation of determining the state matrix.

Step 303: Determine, based on the state matrix, a torque for controlling the wheeled robot.

The torque for controlling the wheeled robot is obtained based on the state matrix. The torque is calculated based on an objective of controlling the wheeled robot to be in the standstill state.

In some embodiments, the torque is calculated according to linear output regulation. The following discloses an exemplary specific implementation with reference to FIG. 4, but this application does not limit a specific method for determining the control torque.

Step 304: Control, by using the torque, the wheeled robot to be in the standstill state.

In some embodiments, the calculated torque is transmitted to the motor, and the motor electrically controls the wheel of the wheeled robot, and controls the wheel to rotate by using the torque as a target, thereby driving the wheel structure of the wheeled robot and the body portion of the wheeled robot to be in the standstill state gradually. This application does not limit the implementation of applying the torque. For example, a hydraulic-based driving manner is also included in this application.

Based on the above, according to the motion state control method provided in the embodiments of this application, before the torque for controlling the wheeled robot is determined, the state matrix that embodies the balance error of the robot is first determined, so as to determine, based on the state matrix, the torque for controlling the wheeled robot is determined, and the wheel of the wheeled robot is controlled by using the torque, so as to control the wheeled robot to be in the standstill state, thereby improving the accuracy of controlling the wheeled robot having the balance error.

FIG. 4 is a flowchart of a motion state control method according to some embodiments of this application. In the embodiment shown in FIG. 4, the estimation of the state matrix embodying the interference parameter is implemented by the observer, for example. The method includes the following steps:

Step 401: Acquire basic data and motion state data, the basic data being used for representing a structural feature of a wheeled robot, and the motion state data being used for representing a motion feature of the wheeled robot.

For an implementation of this step, refer to step 301, which is omitted herein.

Step 402: Determine an observer based on the basic data.

The observer may be an equation that can be used to iteratively update a state matrix estimated by the observer by observing a physical quantity, so as to finally determine the state matrix.

In some embodiments, a form of the observer is designed before the observer is determined based on the basic data.

The form of the observer may be determined according to a form of the state matrix of the wheeled robot.

The form of the state matrix is given below by taking the wheeled biped robot 100 in FIG. 1 as an example. It is to be understood that the state matrix of other wheeled robots may have different forms, and the state matrix of the wheeled biped robot 100 may be in an approximate form or represented in other forms, which are all within the disclosure scope of this application.

In some embodiments, a matrix parameter in the observer is determined based on the basic data, and the observer for determining the state matrix is acquired according to the matrix parameter.

The kinematic model equation I of the wheeled biped robot 100 near the balance point may be ideally approximated as linear. Refer to the following equation II:

$$\dot{\xi} = A\xi + Bu.$$ Equation II:

$\xi = [\theta \ \dot{\theta} \ x \ \dot{x}]^T$, A and B are matrix parameters, $$A = \begin{bmatrix} 0 & 1 & 0 & 0 \\ \frac{M+m}{Ml}g & 0 & 0 & 0 \\ 0 & 0 & 0 & 1 \\ -\frac{m}{M}g & 0 & 0 & 0 \end{bmatrix},$$

$$B = \begin{bmatrix} 0 \\ -\frac{1}{Ml} \\ 0 \\ \frac{1}{M} \end{bmatrix},$$

and g represents the acceleration of gravity.

In some embodiments, a maximum value of the pitch angle is a desired value that matches a mathematical model. However, in other embodiments, θ measured by the IMU may deviate from a true value due to the reasons described above. Therefore, due to the balance error of the wheeled biped robot, that is, an interference parameter, the measured pitch angle may be corrected according to the following equation:

$$\tilde{\theta} = \theta + d.$$ Equation III:

$\tilde{\theta}$ represents a corrected value of the pitch angle, θ represents a measured or theoretical pitch angle, and d represents the interference parameter in the embodiments of this application, which is a constant.

Based on the equation III, the equation II of the state matrix of the above wheeled biped robot may be transformed to the following equation IV:

$$\dot{\tilde{\xi}} = A\tilde{\xi} + Bu + E_d d.$$ Equation IV:

$\tilde{\xi}$ used for representing a state of a dynamical system, and u is the applied torque, that is, an input of the dynamic system, $\tilde{\xi} = [\tilde{\theta} \ \dot{\theta} \ x \ \dot{x}]^T$, $\dot{\tilde{\theta}} = \dot{\theta}$, and $$E_d = \begin{bmatrix} 0 & -\frac{M+m}{Ml}g & 0 & \frac{m}{M}g \end{bmatrix}^T.$$

In some embodiments, an iteration value in the observer is selected according to a meaning of the physical quantity. An actual value of the iteration value may be measured, or may be calculated according to the measured physical quantity. Therefore, a form of the iteration value may be selected depending on the physical quantity that can be measured, or depending on the form or the content of the motion state data. Exemplarily, the form of the iteration value in the observer is determined based on the content of the motion state data. In some embodiments, the iteration value of the observer may be selected from the following physical quantities: the tilt angle of the wheeled robot, the tilt rate, the rotation distance of the wheel, and the rotational linear velocity of the wheel.

For example, an iteration quantity $y_m$ in the observer may be defined as follows:

$$y_m = \begin{bmatrix} \theta \\ x \end{bmatrix} = C_m \xi. \quad \text{Equation V}$$

$$C_m = \begin{bmatrix} 1 & 0 & 0 & 0 \\ 0 & 0 & 1 & 0 \end{bmatrix},$$

that is to say, first and third terms in the above. $\xi = [\tilde{\theta} \ \dot{\theta} \ x \ \dot{x}]^T$ are selected through the matrix.

Certainly, this application does not limit a specific selection of the iteration value. For example, in some embodiments, the iteration value may be selected as $\dot{\theta}$ and $\dot{x}$. That is to say, second and fourth terms in the above $\xi = [\tilde{\theta} \ \dot{\theta} \ x \ \dot{x}]^T$ are selected.

The form of the observer is described below by using the wheeled biped robot 100 as an example. It is to be understood that the observer may have a plurality of implementations for state matrices having different forms. This application does not limit a specific selection of the form of the observer.

In some embodiments, for the state matrix in the equation IV, the observer may use the following form:

$$\dot{\hat{\zeta}} = \hat{A}\hat{\zeta} + \hat{B}u + L(y_m - \hat{C}\hat{\zeta}). \quad \text{Equation VI:}$$

The state matrix estimated by the observer is $$\hat{\zeta} = \begin{bmatrix} \hat{\tilde{\theta}} & \hat{\dot{\theta}} & \hat{x} & \hat{\dot{x}} & \hat{d} \end{bmatrix}^T, \hat{A} = \begin{bmatrix} A & E_d \\ 0 & 0 \end{bmatrix}, \hat{B} = [B; 0],$$

and $\hat{C} = [C_m \ 0]$.

Those skilled in the art understand that the observer in the form of the equation VI may be used to observe the state matrix in the form of the equation IV.

The matrix parameters $\hat{A}$ and $\hat{B}$ in the observer may be determined according to the basic data such as M, m, l, and g. The matrix parameter $\hat{C}$ is known. $y_m$ is an actual value of the iteration value, and $\hat{C}\hat{\zeta}$ is an estimated value of the iteration value. L may be a preset parameter, indicating a magnitude by which the observer performs iterative updating according to a difference between the actual value and the estimated value of the iteration value.

Therefore, this embodiment exemplarily discloses how to determine the observer based on the basic data.

Step 403: Determine the state matrix through the observer based on the motion state data.

The state matrix including the interference parameter is determined through the observer based on the motion state data. In some embodiments, the state matrix estimated by the observer is iteratively updated according to the observed motion state data, to finally determine the state matrix.

In some embodiments, the state matrix is first estimated by the observer, so as to determine the estimated value of the iteration value according to the state matrix estimated by the observer and determine the actual value of the iteration value according to the motion state data, the difference between the estimated value and the actual value of the iteration value is acquired, and the estimated state matrix is updated through the observer according to the difference. In some embodiments, the process is repeated a plurality of times to iteratively update the state matrix estimated by the observer, so as to continuously approximate the state matrix, thereby finally determining the state matrix. A quantity of times of the iterative updating of the state matrix is preset. Alternatively, the quantity of times of the iterative updating of the state matrix is determined according to the difference between the estimated value and the actual value of the iteration value. In some embodiments, taking the wheeled biped robot as an example, the estimated state matrix $\hat{\zeta}$ in the equation VI of the observer is iteratively updated according to the iteration value difference $(y_m - \hat{C}\hat{\zeta})$, to finally determine the state matrix $\hat{\zeta}$. $\hat{\zeta}$ includes the estimated $\hat{\tilde{\theta}}$, $\hat{\dot{\theta}}$, $\hat{x}$, $\hat{\dot{x}}$, and the interference parameter $\hat{d}$. Since the iterative updating manner can continuously adapt to a new state matrix, in this embodiment, the state matrix with the interference parameter being changed during the motion can be determined. For example, the height of the wheeled biped robot is changed during the motion, which causes the balance point and the state matrix to change. Even so, the observer can still adjust the determined changed state matrix according to the motion state data with the state being changed.

Thus, this embodiment exemplarily discloses how to determine the state matrix including interference parameter through the observer based on the motion state data.

Step 404: Determine, based on the state matrix, a torque for controlling the wheeled robot.

A control operation to be performed on the robot may be determined according to the state matrix obtained by the observer, such as applying the control torque. When the objective is to maintain the wheeled robot in standstill balance, a target state of the system, that is, a target output of the dynamic system is $\tilde{\theta}$ approximating zero and $\dot{x}$ approximating zero. An input of the system is determined according to the target output of the system.

In an embodiment, an input matrix for controlling the wheeled robot is determined, and a product of the input matrix and the state matrix is determined as the torque for controlling the wheeled robot.

Taking the wheeled biped robot as an example, $\dot{\theta}$ and $\dot{x}$ can approximate zero only when an input matrix $K = [k_x \ k_d]$ and a specific vector $X_c$ exist. $k_x$ and $k_d$ are elements in the input matrix. $k_x$ is a gain matrix, and $k_d$ is a gain coefficient. Exemplarily, the input matrix K may be calculated based on the following equations VII and VIII.

$$0 = \begin{bmatrix} A & BK \\ LC_m & \hat{A} + \hat{B}K - L\hat{C} \end{bmatrix} X_c + \begin{bmatrix} E_d \\ 0 \end{bmatrix} \quad \text{Equation VII}$$

$$0 = [C \ 0]X_c. \quad \text{Equation VIII:}$$

$$C = \begin{bmatrix} 0 & 1 & 0 & 0 \\ 0 & 0 & 0 & 1 \end{bmatrix}.$$

The equation VII and the equation VIII are combined into an equation set, so as to calculate the input matrix K.

A product of the input matrix K and the above state matrix $\hat{\zeta}$ is inputted to the motor as the torque u.

Therefore, the embodiment discloses the method for determining, based on the state matrix, the torque for controlling the wheeled robot, but this application does not limit the specific method for determining the torque for controlling the wheeled robot.

Step 405: Control, by using the torque, the wheeled robot to be in the standstill state.

In some embodiments, the wheel of the wheeled robot is controlled based on the torque, and the wheeled robot is stabilized in the standstill state. This application does not limit a specific implementation of controlling, by using the torque, the wheeled robot to be in the standstill state.

Based on the above, according to the motion state control method provided in the embodiments of this application, before the torque for controlling the wheeled robot is determined, the state matrix of the wheeled robot in a current state is determined through the observer, the state matrix including the balance error (the interference parameter), so as to determine, based on the state matrix, the torque for controlling the wheeled robot, and the wheel of the wheeled robot is controlled by using the torque, so as to control the wheeled robot to be in the standstill state, thereby improving the accuracy of controlling the wheeled robot having the balance error.

Exemplarily, this application is applied to the embodiment of the wheeled biped robot 100. The wheeled robot is controlled through linear output regulation, and the stability and performance of the linear output regulation are verified through experiments. First, parameters are summarized in Table 1.

TABLE 1

| | Parameters |
|---|---|
| Robot/IPC | m = 11 kg; M = 3 kg; g = 9.81 m/s²; 0.37 m ≤ l ≤ 0.7 m; $r_w$ = 0.1 m; $d_w$ = 0.47 m |
| Output regulation | $k_x$ = [150 12 0.001 10]; $k_d$ = −167; $L = \begin{bmatrix} 27.63 & 397.75 & -6.48 & -111.4 & -0.45 \\ 6.48 & -105.39 & 5.84 & 33.03 & 0.15 \end{bmatrix}^T$ |

Robot/IPC in the second row represents the basic data of the wheeled biped robot 100. For example, m represents that the mass of the body portion is 11 kg; M represents that the mass of the wheel is 3 kg; g represents that the acceleration of gravity is 9.81 m/s²; l is the height, which is adjustable between 0.37 meters and 0.7 meters (that is, the distance from the motor of the body portion to the ground at different use angles); and $r_w$ represents the radius of the wheel, and $d_w$ represents the distance between the two wheels.

Output regulation in the third row represents the parameters used in the linear output regulation method obtained in the embodiments of this application, including but not limited to the gain matrix $k_x$, the gain parameter $k_d$, and the matrix L in the input matrix.

The pitch angle θ, a roll angle φ, and rates of the pitch angle θ and the roll angle φ are measured through the IMU according to the above parameters. In addition, an angular velocity $\omega_r$ (rad/s) of a right wheel and an angular velocity $\omega_l$ (rad/s) of a left wheel are read through a motor coder. Then, a linear velocity $\dot{x}$ and a yaw rate $\dot{\gamma}$ of the wheeled biped robot 100 in an x direction are calculated, which is shown as the following equation IX:

$$\dot{x} = \frac{\omega_r + \omega_l}{2} r_w \quad \text{Equation IX}$$
$$\dot{\gamma} = \frac{\omega_r - \omega_l}{2} r_w$$

During control of the wheeled biped robot 100 based on a balance force u, the balance force is converted to a torque through an equation $\tau = 0.5 r_w u$. τ is an average torque of the left and right motors. The average torque τ plus the yaw torque $\tau_y = 0.3(\dot{\gamma} - \dot{\gamma}^*)$ is used as a torque applied to the left motor, and the average torque τ and the yaw torque $\tau_y = 0.3(\dot{\gamma} - \dot{\gamma}^*)$ is used as a torque applied to the right motor, thereby rotating the wheeled biped robot 100. $\dot{\gamma}^*$ is a relative yaw rate provided by a remote controller. Since a sum of the yaw torques does not change a total torque in the x direction, the balance of the robot is not destroyed.

During the experiment, a central processing unit (CPU) with a model PICO-WHU4 is used. A processing cycle of the CPU is $T_s \approx 0.002$ s, and the CPU calculates x through $x_k = x_{k-1} + T_s \dot{x}_{k-1}$, and discretizes the observer. $x_k$ represents a distance at a moment k, $x_{k-1}$ represents a distance at a moment k−1, and $\dot{x}_{k-1}$ represents a velocity at the moment k−1.

Exemplarily, the linear output regulation method provided in the embodiments of this application is described by using an experimental result of controlling the wheeled biped robot 100 to be in the standstill state as an example.

Figure 5:
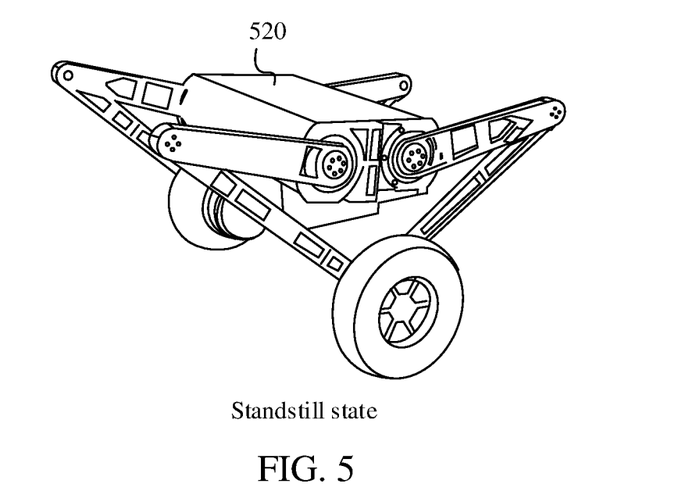
FIG. 5 is a schematic diagram showing a wheeled robot in an experimental process according to an exemplary embodiment of this application.

FIG. 5 shows a state of the wheeled biped robot 520 during the experiment. That is, the wheeled biped robot 520 is controlled to be in the standstill state with the height remaining unchanged.

In some embodiments, linear output regulation with an observer is used to keep the robot stationary at a minimum height pose. FIG. 6 to FIG. 10 show a comparison between a physical quantity estimated by the observer with an actual observed value.

Figure 6:
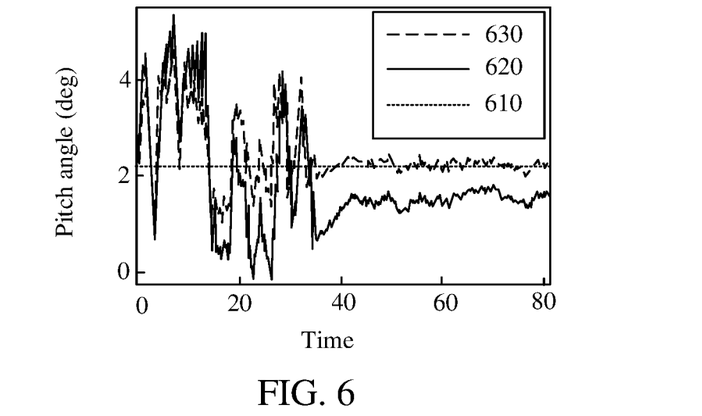
FIG. 6 is a graph showing a comparison between a measured state and an observed value of a pitch angle over time according to an exemplary embodiment of this application.

FIG. 6 is a graph showing a comparison between an estimated value of the pitch angle estimated by the observer and an actual value of the pitch angle, with time being an abscissa. As shown in FIG. 6, during the state adjustment of the wheeled biped robot 520, the estimated value of the pitch angle estimated by the observer is shown by a curve 620, and the actual value of the pitch angle is shown by a curve 630. The value of the pitch angle when the wheeled biped robot 520 is finally balanced is shown by a curve 610.

Figure 7:
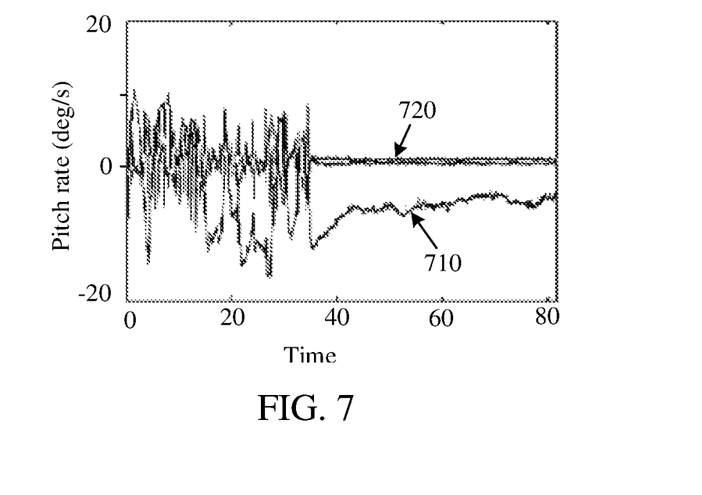
FIG. 7 is a graph showing a comparison between an estimated value and an actual value of a pitch rate over time according to an exemplary embodiment of this application.

FIG. 7 is a graph showing a comparison between an estimated value of the pitch rate estimated by the observer and an actual value of the pitch rate, with time being an abscissa. As shown in FIG. 7, during the state adjustment of the wheeled biped robot 520, the estimated value of the pitch rate estimated by the observer is shown by a curve 710, and the actual value of the pitch rate is shown by a curve 720.

Figure 8:
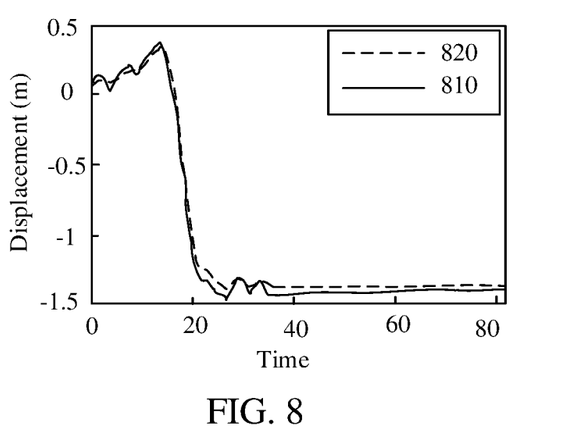
FIG. 8 is a graph showing a comparison between an estimated value and an actual value of a displacement over time according to an exemplary embodiment of this application.

FIG. 8 is a graph showing a comparison between an estimated value of the displacement estimated by the observer and an actual value of the displacement, with time being an abscissa. As shown in FIG. 8, during the state adjustment of the wheeled biped robot 520, the estimated value of the displacement estimated by the observer is shown by a curve 810, and the actual value of the displacement is shown by a curve 820.

Figure 9:
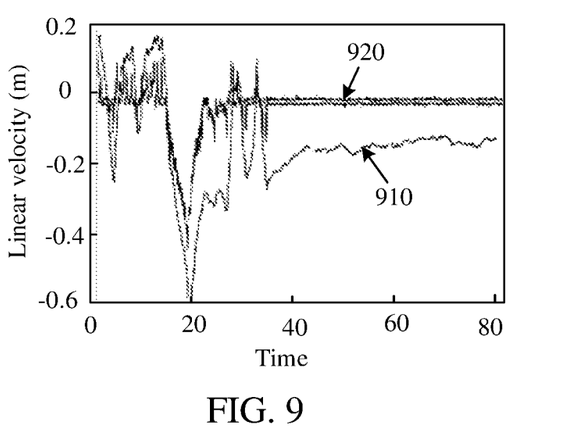
FIG. 9 is a graph showing a comparison between an estimated value and an actual value of a linear velocity over time according to an exemplary embodiment of this application.

FIG. 9 is a graph showing a comparison between an estimated value of the linear velocity estimated by the observer and an actual value of the linear velocity, with time being an abscissa. As shown in FIG. 9, during the state adjustment of the wheeled biped robot 520, the estimated value of the linear velocity estimated by the observer is shown by a curve 910, and the actual value of the linear velocity is shown by a curve 920.

Figure 10:
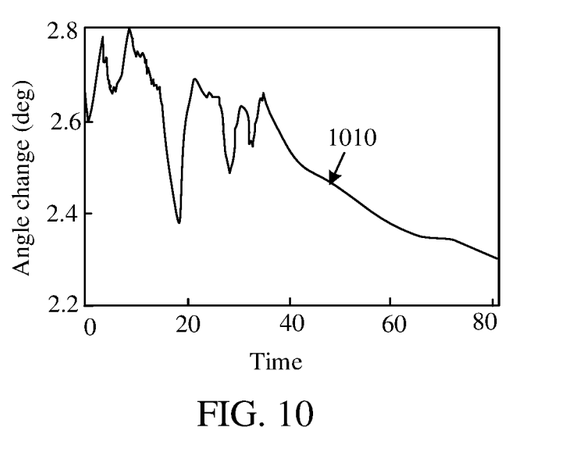
FIG. 10 is a graph of an error value of a pitch angle over time according to an exemplary embodiment of this application.

FIG. 10 is a graph showing a change of a difference between the estimated value of the pitch rate observed by the observer and the actual value of the pitch rate, with time being an abscissa. As shown in FIG. 10, during the state adjustment of the wheeled biped robot 520, a change of difference is shown by a curve 1010.

It can be learned from FIG. 6 to FIG. 10 that when the actual balance point is unknown, the estimated state matrix gradually approaches the actual state matrix, and the wheeled biped robot 520 successfully reaches a still and balanced state. In the balanced state, the estimated state matrix is still different from the actual state matrix to some extent, which is caused by friction between the wheel and a carpet. However, it can be learned from FIG. 10 that after the still and balanced state is realized, the linear output regulation further causes the estimated value to approximate the actual value.

Based on the above, according to the motion state control method provided in the embodiments of this application, before the torque for controlling the wheeled robot is determined, the state matrix of the wheeled robot is determined, the state matrix embodying the interference parameter of the wheeled robot, so as to determine, based on the state matrix, the torque for controlling the wheeled robot, and the wheel of the wheeled robot is controlled by using the torque, so as to control the wheeled robot to be in the standstill state, thereby improving the accuracy of controlling the wheeled robot.

Figure 11:
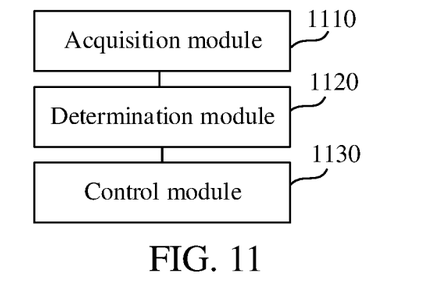
FIG. 11 is a structural block diagram of a motion state control apparatus according to an exemplary embodiment of this application.

FIG. 11 is a structural block diagram of a motion state control apparatus according to an exemplary embodiment of this application. As shown in FIG. 11, the apparatus includes:
- an acquisition module 1110, configured to perform the embodiments in step 301 and step 401;
- a determination module 1120, configured to perform the embodiments in step 302, step 303, step 402, step 403, and step 404; and
- a control module 1130, configured to perform the embodiments in step 303 and step 405.

Based on the above, according to the motion state control method provided in the embodiments of this application, before the torque for controlling the wheeled robot is determined, the state matrix of the wheeled robot is determined, the state matrix embodying the interference parameter of the wheeled robot, so as to determine, based on the state matrix, the torque for controlling the wheeled robot, and the wheel of the wheeled robot is controlled by using the torque, so as to control the wheeled robot to be in the standstill state, thereby improving the accuracy of controlling the wheeled robot.

The motion state control apparatus provided in the above embodiments is merely exemplified through division of the above functional modules. In actual application, the above functions may be allocated to and completed by different functional modules as required. That is to say, the internal structure of the device is divided into different functional modules, to implement all or some of the functions described above. In addition, the motion state control apparatus provided in the above embodiments belongs to a same concept as the embodiments of the motion state control method. For the specific implementation, refer to the method embodiments, and the details are not described herein again.

Figure 12:
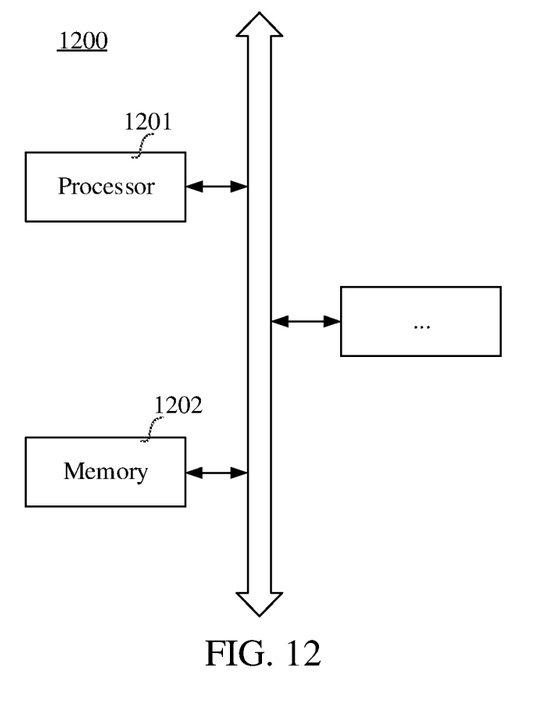
FIG. 12 is a structural block diagram of a terminal according to an exemplary embodiment of this application.

FIG. 12 is a structural block diagram of an electronic device 1200 according to an exemplary embodiment of this application. The electronic device 1200 may be a portable mobile terminal, such as: a smartphone, a tablet computer, a moving picture experts group audio layer III (MP3) player, a moving picture experts group audio layer IV (MP4) player, a notebook computer, or a desktop computer. The electronic device 1200 may also be referred to as another name such as user equipment, a portable terminal, a laptop terminal, or a desktop terminal. In this embodiment of this application, the electronic device 1200 is implemented as a control device of the wheeled robot.

The electronic device 1200 usually includes a processor 1201 and a memory 1202.

The processor 1201 may include one or more processing cores, such as a 4-core processor or an 8-core processor. The processor 1201 may be implemented by at least one hardware form in a digital signal processing (DSP), a field-programmable gate array (FPGA), and a programmable logic array (PLA). the processor 1201 includes a main processor and a coprocessor. The main processor is configured to process data in an active state, also referred to as a central processing unit (CPU). The coprocessor is a low-power consumption processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process computing operations related to machine learning.

The memory 1202 may include one or more computer-readable storage media. The computer-readable storage media may be non-transitory. The memory 1202 may further include a high-speed random access memory, as well as non-volatile memory, such as one or more disk storage devices and flash storage devices. In some embodiments, the non-transitory computer-readable storage medium in the memory 1202 is configured to store at least one instruction, and the at least one instruction being configured to be executed by the processor 1201 to implement the motion state control method provided in the method embodiments of this application.

In some embodiments, the electronic device 1200 further optionally include other assemblies. A person skilled in the art may understand that the structure shown in FIG. 12 does not constitute a limitation to the electronic device 1200, and the electronic device may include more components or fewer components than those shown in the figure, or some components may be combined, or a different component deployment may be used.

The embodiments of this application further provide a wheeled robot. The wheeled robot includes processor and a memory. The memory stores at least one instruction, at least one program, a code set, or an instruction set. The at least one instruction, the at least one program, the code set, or the instruction set is loaded and executed by the processor to implement the motion state control method according to the foregoing method embodiments.

An embodiment of this application further provides a computer-readable storage medium storing at least one instruction, at least one segment of program, a code set or an instruction set, the at least one instruction, the at least one segment of program, the code set or the instruction set being loaded and executed by the processor to implement the motion state control method provided in the foregoing method embodiments.

According to an aspect of the embodiments of this application, a computer program product or a computer program is further provided, the computer program product or the computer program including computer instructions, the computer instructions being stored in a computer-readable storage medium. A processor of a computer device reads the computer instructions from the computer-readable storage medium and executes the computer instructions to cause the computer device to perform the motion state control method described in any one of the foregoing embodiments.

What is claimed is:

1. A motion state control method, applicable to a wheeled robot, the method comprising:
controlling the wheeled robot to be in an initial motion state, the initial motion state being a motion state of the wheeled robot in a first time period; and
controlling the wheeled robot to switch from the initial motion state to a standstill state, the wheeled robot being in the standstill state through continuous adjustment according to a balance error in a second time period by:
acquiring basic data and motion state data of the wheeled robot, the basic data representing a structural feature of the wheeled robot, and the motion state data representing a motion feature of the wheeled robot, the motion state data comprising a plurality of motion state values comprising: a corrected pitch angle of the wheeled robot that is corrected by an interference parameter, a tilt rate of the wheeled robot, a rotational distance of a wheel of the wheeled robot, and a rotational linear velocity of the wheel of the wheeled robot;
determining an observer based on the basic data;
iteratively updating an estimate of a state matrix, wherein the state matrix comprises the plurality of motion state values and the interference parameter, wherein the estimate of the state matrix is iteratively updated based on an iteration value comprising at least one of the plurality of motion state values and a first matrix parameter that selects which of the plurality of motion state values to use for the iteration value, wherein the estimate of the state matrix is iteratively updated according to a form of the observer that comprises: $\dot{\hat{\zeta}} = \hat{A}\hat{\zeta} + \hat{B}u + L(y_m - \hat{C}\hat{\zeta})$, wherein $\hat{\zeta}$ is the state matrix estimated through the observer, u is a control torque, L is a preset parameter, $y_m$ is an actual value of the iteration value, $\hat{C}$ is the first matrix parameter, the product $\hat{C}\hat{\zeta}$ is an estimated value of the iteration value, and $\hat{A}$ and $\hat{B}$ are second and third matrix parameters, respectively, determined based on the basic data;
determining, based on the estimate of the state matrix, a torque to control the wheeled robot; and
applying the torque to the wheeled robot.

2. The method according to claim 1, wherein
the interference parameter corresponds to the balance error of the wheeled robot.

3. The method according to claim 1, wherein the determining the observer based on the basic data comprises:
determining the second and third matrix parameters in the observer based on the basic data; and
obtaining, according to the second and third matrix parameters, the observer to determine the state matrix.

4. The method according to claim 1, further comprising:
determining the form of the observer based on a form of the state matrix of the wheeled robot; and determining a form of the iteration value in the observer based on content of the motion state data.

5. The method according to claim 1, wherein $$\hat{A} = \begin{bmatrix} A & E_d \\ 0 & 0 \end{bmatrix},$$

and $$\hat{B} = [B;\ 0], A = \begin{bmatrix} 0 & 1 & 0 & 0 \\ \frac{M+m}{Ml}g & 0 & 0 & 0 \\ 0 & 0 & 0 & 1 \\ -\frac{m}{M}g & 0 & 0 & 0 \end{bmatrix}, B = \begin{bmatrix} 0 \\ -\frac{1}{Ml} \\ 0 \\ \frac{1}{M} \end{bmatrix},$$

and $$E_d = \begin{bmatrix} 0 & -\frac{M+m}{Ml}g & 0 & \frac{m}{M}g \end{bmatrix}^T,$$

m being a mass of a body portion of the wheeled robot, M being a mass of a wheel of the wheeled robot, and l being a height of the wheeled robot.

6. The method according to claim 1, further comprising:
determining a changed state matrix of the wheeled robot based on changed basic data and changed motion state data after the basic data or the motion state data of the wheeled robot changes.

7. The method according to claim 1, wherein the determining, based on the estimate of the state matrix, the torque to control the wheeled robot comprises:
determining an input matrix to control the wheeled robot, the input matrix being a matrix determined based on the basic data of the wheeled robot; and
determining a product of the input matrix and the estimate of the state matrix as the torque to control the wheeled robot.

8. The method according to claim 7, wherein the determining the input matrix to control the wheeled robot comprises:
determining an equation between the control torque and the state matrix in a case that the pitch rate and the linear velocity of the wheeled robot approximate zero; and
determining the input matrix according to the equation.

9. The method according to claim 7, wherein the input matrix satisfies:

$$0 = \begin{bmatrix} A & BK \\ LC_m & \hat{A} + \hat{B}K - L\hat{C} \end{bmatrix} X_c + \begin{bmatrix} E_d \\ 0 \end{bmatrix}$$

and $$0 = [C\ 0]X_c, A = \begin{bmatrix} 0 & 1 & 0 & 0 \\ \frac{M+m}{Ml}g & 0 & 0 & 0 \\ 0 & 0 & 0 & 1 \\ -\frac{m}{M}g & 0 & 0 & 0 \end{bmatrix}, B = \begin{bmatrix} 0 \\ -\frac{1}{Ml} \\ 0 \\ \frac{1}{M} \end{bmatrix},$$

and $$E_d = \begin{bmatrix} 0 & -\frac{M+m}{Ml}g & 0 & \frac{m}{M}g \end{bmatrix}^T,$$

K being the input matrix, m being a mass of a body portion of the wheeled robot, M being a mass of a wheel of the wheeled robot, l being a height of the wheeled robot, $$C = \begin{bmatrix} 0 & 1 & 0 & 0 \\ 0 & 0 & 0 & 1 \end{bmatrix}, C_m = \begin{bmatrix} 1 & 0 & 0 & 0 \\ 0 & 0 & 1 & 0 \end{bmatrix},$$

$$\hat{A} = \begin{bmatrix} A & E_d \\ 0 & 0 \end{bmatrix}, \hat{B} = [B; \ 0], \hat{C} = [C_m \ 0],$$

and L being the preset parameter.

10. The method according to claim 1, wherein the wheeled robot comprises a body portion and a wheel leg portion, the wheel leg portion and the body portion being an inverted pendulum structure, and the height of the wheeled robot being adjusted through the wheel leg portion.

11. An apparatus for controlling a motion state of a wheeled robot, the apparatus comprising:
a memory storing a plurality of instructions; and
a processor configured to execute the plurality of instructions, and upon execution of the plurality of instructions, is configured to:
control the wheeled robot to be in an initial motion state, the initial motion state being a motion state of the wheeled robot in a first time period,
control the wheeled robot to switch from the initial motion state to a standstill state, the wheeled robot being in the standstill state through continuous adjustment according to a balance error in a second time period, wherein in order to control the wheeled robot to switch from the initial motion state to the standstill state, the processor, upon execution of the plurality of instructions, is configured to:
acquire basic data and motion state data of the wheeled robot, the basic data representing a structural feature of the wheeled robot, and the motion state data representing a motion feature of the wheeled robot, the motion state data comprising a plurality of motion state values comprising: a corrected pitch angle of the wheeled robot that is corrected by an interference parameter, a tilt rate of the wheeled robot, a rotational distance of a wheel of the wheeled robot, and a rotational linear velocity of the wheel of the wheeled robot;
determine an observer based on the basic data;
iteratively update an estimate of a state matrix, wherein the state matrix comprises the plurality of motion state values and the interference parameter, wherein the estimate of the state matrix is iteratively updated based on an iteration value comprising at least one of the plurality of motion state values and a first matrix parameter that selects which of the plurality of motion state values to use for the iteration value, wherein the estimate of the state matrix is iteratively updated according to a form of the observer that comprises: $\dot{\hat{\zeta}} = \hat{A}\hat{\zeta} + \hat{B}u + L(y_m - \hat{C}\hat{\zeta})$, wherein $\hat{\zeta}$ is the state matrix estimated through the observer, u is a control torque, L is a preset parameter, $y_m$ is an actual value of the iteration value, $\hat{C}$ is the first matrix parameter, the product $\hat{C}\hat{\zeta}$ is an estimated value of the iteration value, and $\hat{A}$ and $\hat{B}$ are second and third matrix parameters, respectively, determined based on the basic data;
determine, based on the estimate of the state matrix, a torque to control the wheeled robot; and
apply the torque to the wheeled robot.

12. The apparatus according to claim 11, wherein the interference parameter corresponds to the balance error of the wheeled robot.

13. The apparatus according to claim 11, wherein the processor, upon execution of the plurality of instructions, is further configured to determine the second and third parameter matrices in the observer based on the basic data; and obtain, according to the second and third parameter matrices, the observer to determine the state matrix.

14. The apparatus according to claim 11, wherein the processor, upon execution of the plurality of instructions, is further configured to:
determine an input matrix to control the wheeled robot, the input matrix being a matrix determined based on the basic data of the wheeled robot; and
determine a product of the input matrix and the estimate of the state matrix as the torque to control the wheeled robot.

15. The apparatus according to claim 11, wherein the wheeled robot comprises a body portion and a wheel leg portion, the wheel leg portion and the body portion being an inverted pendulum structure, and the height of the wheeled robot being adjusted through the wheel leg portion.

* * * * *

UNITED STATES PATENT AND TRADEMARK OFFICE
CERTIFICATE OF CORRECTION

| | | |
|---|---|---|
| PATENT NO. | : 12,321,180 B2 | Page 1 of 1 |
| APPLICATION NO. | : 17/966027 | |
| DATED | : June 3, 2025 | |
| INVENTOR(S) | : Shuai Wang et al. | |

It is certified that error appears in the above-identified patent and that said Letters Patent is hereby corrected as shown below:

In the Claims

Column 18, Claim 11, Line 15, delete ":".

Signed and Sealed this
Twenty-third Day of December, 2025

John A. Squires
*Director of the United States Patent and Trademark Office*